US012587563B2

(12) United States Patent　　　　　(10) Patent No.:　US 12,587,563 B2
Feder et al.　　　　　　　　　　　　(45) Date of Patent:　　Mar. 24, 2026

(54) SYSTEMS AND METHODS FOR DETECTING AND REMEDIATING DDoS ATTACKS BASED ON ENERGY CONSUMPTION

(71) Applicant: Verizon Patent and Licensing Inc., Basking Ridge, NJ (US)

(72) Inventors: Peretz Feder, Englewood, NJ (US); Egemen K. Çetinkaya, Hillsborough, NJ (US); Yousif Targali, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/675,289

(22) Filed: May 28, 2024

(65) Prior Publication Data

US 2025/0373654 A1　　　Dec. 4, 2025

(51) Int. Cl.
H04L 9/40　　　　　(2022.01)
H04W 8/18　　　　　(2009.01)

(52) U.S. Cl.
CPC ........... H04L 63/1458 (2013.01); H04W 8/18 (2013.01)

(58) Field of Classification Search
None
See application file for complete search history.

(56) References Cited

U.S. PATENT DOCUMENTS

| | | | | |
|---|---|---|---|---|
| 2006/0229022 A1* | 10/2006 | Bu | ...................... | H04L 63/1458 |
| | | | | 455/425 |
| 2016/0142436 A1* | 5/2016 | Gehrmann | ............ | H04L 63/123 |
| | | | | 726/23 |
| 2018/0375887 A1* | 12/2018 | Dezent | .................... | H04W 4/70 |
| 2021/0211458 A1* | 7/2021 | Huang | .................... | H04L 47/27 |
| 2023/0412324 A1* | 12/2023 | Bhamri | ................. | H04L 1/1854 |

FOREIGN PATENT DOCUMENTS

| | | | | | |
|---|---|---|---|---|---|
| CN | 102196420 A | * | 9/2011 | | |
| CN | 117579401 A | * | 2/2024 | ......... | H04L 63/0218 |
| FR | 3111250 A1 | * | 12/2021 | ......... | H04L 63/1416 |

* cited by examiner

*Primary Examiner* — Jeffrey R Swearingen

(57)　　　　　　　ABSTRACT

Systems and methods described herein detect user equipment (UE)-based denial-of-service (DoS) or distributed denial-of-service (DDoS) attacks based on energy consumption levels. An energy consumption (EC) DDoS monitoring service, collects, from one or more network devices in a core network, energy consumption data and identifies, based on the energy consumption data, normal energy consumption levels of one or more UE devices or network functions. The EC DDoS monitoring service determines, based on the normal energy consumption levels, energy consumption thresholds indicative of a DoS or DDoS attack.

20 Claims, 8 Drawing Sheets

800

Collect energy consumption data from network 〜810

Identify normal energy consumption levels 〜820

Classify expected consumption per UE device type 〜830

Determine energy consumption thresholds indicative of DDoS attack 〜840

Collect updated energy consumption data 〜850

Monitor updated energy consumption data against the energy consumption thresholds 〜860

Inform consumer network function of a possible DDoS attack when an energy consumption threshold is exceeded 〜870

Initiate remediation action 〜880

500

510                 515

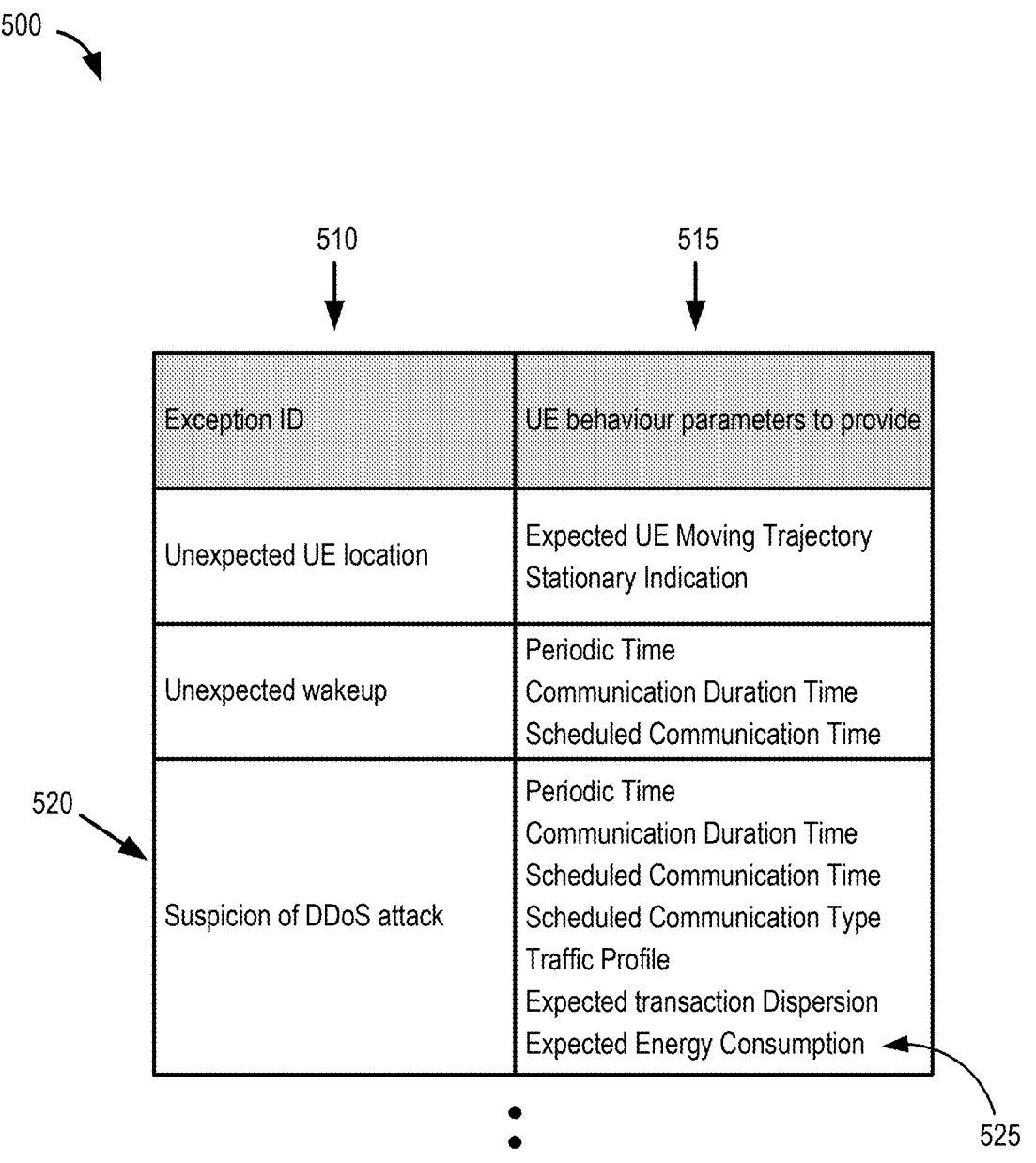

| Exception ID | UE behaviour parameters to provide |
|---|---|
| Unexpected UE location | Expected UE Moving Trajectory<br>Stationary Indication |
| Unexpected wakeup | Periodic Time<br>Communication Duration Time<br>Scheduled Communication Time |
| Suspicion of DDoS attack | Periodic Time<br>Communication Duration Time<br>Scheduled Communication Time<br>Scheduled Communication Type<br>Traffic Profile<br>Expected transaction Dispersion<br>Expected Energy Consumption |

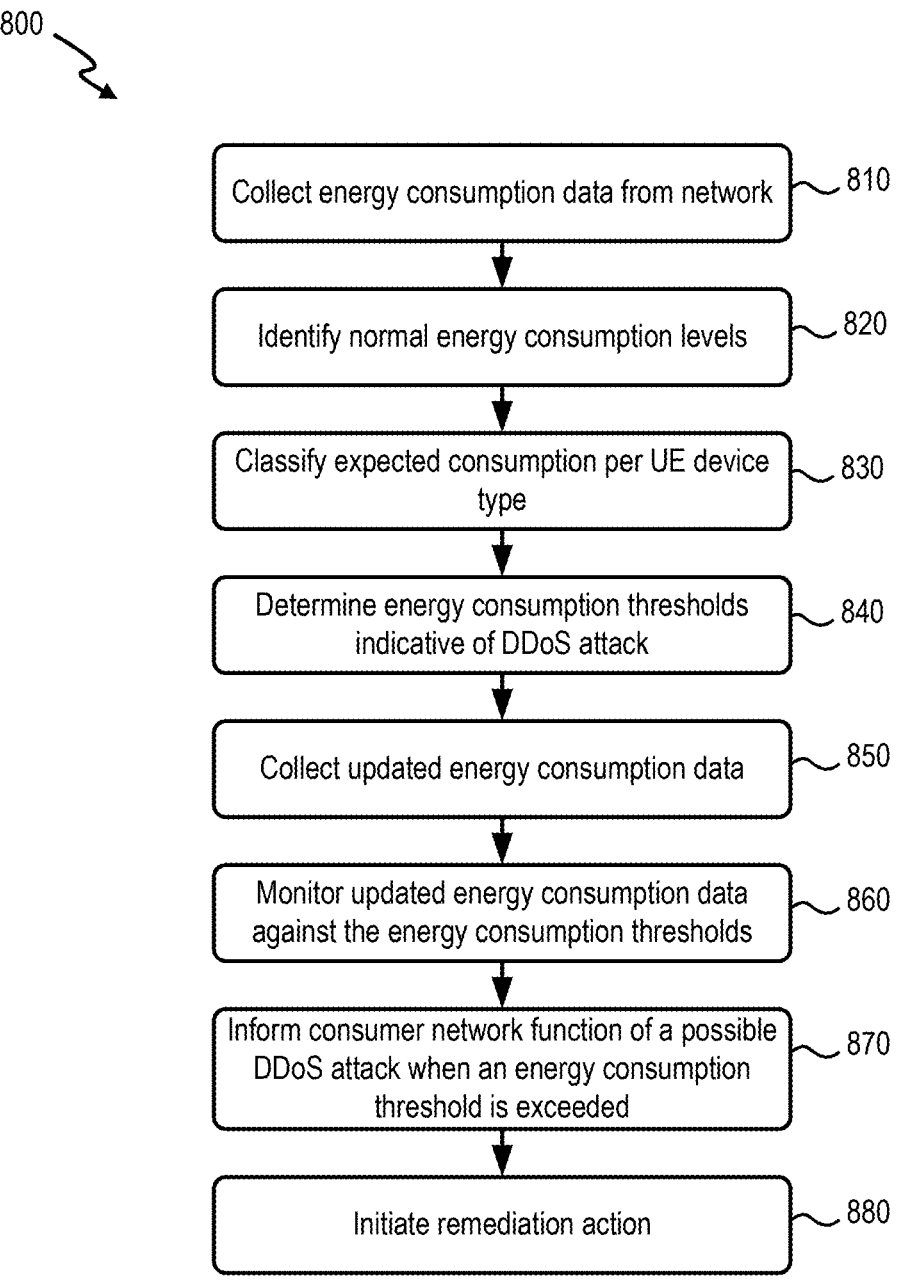

800

Collect energy consumption data from network — 810

Identify normal energy consumption levels — 820

Classify expected consumption per UE device type — 830

Determine energy consumption thresholds indicative of DDoS attack — 840

Collect updated energy consumption data — 850

Monitor updated energy consumption data against the energy consumption thresholds — 860

Inform consumer network function of a possible DDoS attack when an energy consumption threshold is exceeded — 870

Initiate remediation action — 880

FIG. 8

SYSTEMS AND METHODS FOR DETECTING AND REMEDIATING DDoS ATTACKS BASED ON ENERGY CONSUMPTION

BACKGROUND

Computer devices and networks may become subject to events that disrupt the functionality of the devices or networks or that exhaust the resources of the devices or networks. One example of such an event is a distributed denial-of-service (DDoS) attack. In a DDoS attack, multiple computer systems may flood a target system, such as a server device, with requests or commands that attempt to exhaust the resources of the target system in order to make the resources unavailable to legitimate users. For example, a device under a DDoS attack may consume computational resources, such as bandwidth, memory, or processor time. A DDoS attack may be quite damaging to both the target system and the users of the target system. The widespread use of user equipment (UE) devices in mobile networks, and especially Internet of Things (IoT) devices, provides abundant opportunities for botnet attacks that use UE devices for launching DDoS attacks. Given the expected growth in the number of UE devices and the increased throughput in 5G and future networks, UE-based DDoS attacks are a continuously growing risk.

BRIEF DESCRIPTION OF THE DRAWINGS

FIG. 5 is a table illustrating expected UE behavior parameters that may be detectable by a Network Data Analytics Function (NWDAF), according to an implementation;

FIG. 8 is a flow diagram illustrating exemplary processes for providing the EC DDoS monitoring service, according to implementations described herein.

DETAILED DESCRIPTION

The following detailed description refers to the accompanying drawings. The same reference numbers in different drawings may identify the same or similar elements. Also, the following detailed description does not limit the invention.

Network slicing is a technology available in advanced wireless networks, such as Fifth Generation (5G), Sixth Generation, and future networks. Network slicing is based on the concept of creating multiple virtual networks on a common physical infrastructure. The virtual networks can be configured to guarantee an agreed service level for specific functionality requested from different applications.

No established algorithms for detecting User Equipment (UE)-based denial-of-service (DoS) attacks or distributed denial-of-service (DDoS) attacks on network slices exist. Furthermore, there are no over-the-top (OTT) solutions that are considered effective or cost-effective for handling such DoS/DDoS attacks. For example, existing overload protection mechanisms do not discriminate between normally behaving UE devices and misbehaving UE devices.

Systems and methods described herein detect UE-based DoS and/or DDoS attacks based on energy consumption levels. The systems and methods, herein referred to generally as an Energy Consumption (EC) DDoS Monitoring Service, establish normal energy consumption behaviors, monitor ongoing energy consumption levels to detect possible anomalies, and then take actions at the UE device level, session level, flow level, and/or slice level to mitigate or prevent DoS and/or DDoS attacks. According to an implementation, the EC DDoS monitoring service leverages unique information related to a normal expected UE energy consumption to detect potential DoS and DDoS attacks.

Figure 1:
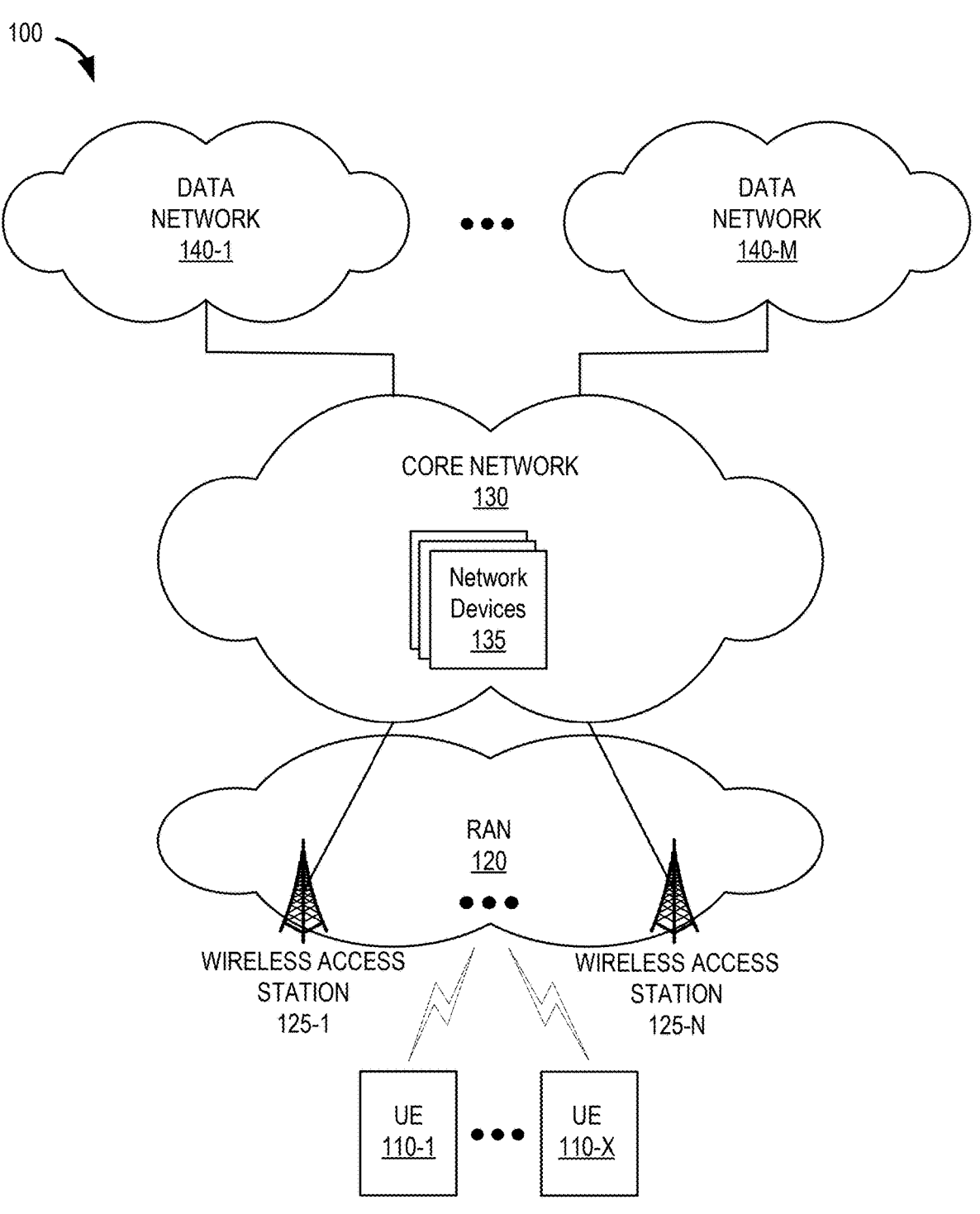
FIG. 1 is a diagram that depicts an exemplary network environment in which systems and methods described herein may be implemented.

FIG. 1 is a diagram of an example environment 100 in which systems and/or methods, described herein, may be implemented. As shown in FIG. 1, environment 100 may include UE devices 110-1 to 110-X (referred to herein collectively as "UE devices 110" and individually as "UE device 110"), a radio access network (RAN) 120, a core network 130, and data networks 140-1 to 140-M (referred to herein collectively or generically as "data network 140"). RAN 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); an Internet of Things (IoT) device; a wearable computer device (e.g., a head-mounted display computer device, a head-mounted camera device, a wristwatch computer device, etc.); a telematics system in a vehicle; a laptop computer, a tablet computer, or another type of portable computer; a desktop computer; a customer premises equipment (CPE) device, such as a set-top box or a digital media player, a WI-FI access point, fixed wireless access (FWA) device, an automated guided vehicle (AGV), a smart television, etc.; a portable gaming system; global positioning system (GPS) device; a home appliance device; a home monitoring device; and/or any other type of computer device with wireless communication capabilities. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication. In still other implementations, UE device 110 may include a Redcap (Reduced capability) device that is used for applications such as industrial wireless sensors. In some implementations, multiple UE devices 110 may be associated in UE device groups, such a group of IoT devices that may be associated via a UE group identifier.

RAN 120 may enable UE devices 110 to wirelessly connect to core network 130 for mobile telephone service, Short Message Service (SMS), Multimedia Message Service (MMS), Internet access, cloud computing, and/or other types of data services. RAN 120 may include wireless access stations 125-1 to 125-N (referred to herein collectively or generically as "wireless access station 125"). Each wireless access station 125 may service a set of UE devices 110. For example, wireless access station 125-1 may service some UE devices 110 when the UE devices 110 are located within the geographic area serviced by wireless access station 125-1, while other UE devices 110 may be serviced by another wireless access station 125 when the UE devices 110 are located within the geographic area serviced by the other wireless access station 125.

Wireless access station 125 may include a 5G base station (e.g., a next generation Node B (gNB)) that includes one or more radio frequency (RF) transceivers configured to send and receive 5G New Radio (NR) wireless signals. According to an implementation, a wireless access station 125 may include a gNB or its equivalent with multiple distributed components, such as a central unit (CU), a distributed unit (DU), a remote unit (RU) or a remote radio unit (RRU), or another type of component to support distributed arrangements. In some implementations, wireless access station 125 may also include a Fourth Generation (4G) base station (e.g., an eNB). Furthermore, in some implementations, wireless access station 125 may include a Multi-Access Edge Computing (MEC) system that performs cloud computing and/or provides network processing services for UE devices 110.

Core network 130 may manage communication sessions for UE devices 110. Core network 130 may provide mobility management, session management, authentication, and packet transport, to support wireless communication services for UE devices 110. Core network 130 may further provide access to data networks 140. Core network 130 may meet known wireless standards which may include, for example, 3GPP 5G (non-standalone (NSA) and standalone (SA)), Long-Term Evolution (LTE), LTE Advanced, Global System for Mobile Communications (GSM), etc. For example, core network 130 may establish an Internet Protocol (IP) connection between UE device 110 and a particular data network 140.

Core network 130 may include various types of network devices 135, which may implement different network functions described further herein. A network device 135 may include a physical function node or a virtual network function (VNF). Thus, the components of core network 130 may be implemented as dedicated hardware components and/or as VNFs implemented on top of a common shared physical infrastructure (referred to herein collectively as network device 135). A network device 135 may include, for example, a 5G network function; a 4G network node; a transport network device, such as, for example, a switch, router, firewall, gateway, an optical switching device (e.g., a reconfigurable optical add-drop multiplexer, etc.), and/or another type of network element. Network devices 135 may include devices that implement network functions such as, among others, an Access and Mobility Management Function (AMF); a Session Management Function (SMF); a User Plane Function (UPF); a Network Exposure Function (NEF) to expose services to third-party servers; an Application Function (AF) to provide services associated with a particular application; a Policy Control Function (PCF); a Unified Data Management (UDM); a Network Data Analytics Function (NWDAF); an Energy Management Function (EMF); a Network Slice Selection Function (NSSF), and a charging function (CHF). In other implementations, network devices 135 may also include functions for a 4G LTE core network (e.g., an evolved packet core (EPC) network).

Data networks 140 may each include a packet data network. A particular data network 140 may include, and/or be connected to and enable communication with, a local area network (LAN), a wide area network (WAN), a metropolitan area network (MAN), an optical network, a cable television network, a satellite network, a wireless network, an intranet, or a combination of networks. Some or all of a particular data network 140 may be managed by a communication services provider that also manages core network 130, RAN 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Network slicing may be implemented through RAN 120, core network 130, and data network 140 (e.g., a transport network). As described further herein, an EC DDoS monitoring system may employ an Artificial Intelligence/Machine Learning (AI/ML)-based system to interact with devices in RAN 120 and/or core network 130 to collect per slice EC data for the purpose of establishing normal EC levels and abnormal EC levels of a slice, thus assisting in the determination of a potential DoS or DDoS attack on the slice. Additionally, or alternatively, the EC DDoS monitoring system may collect statistics to establish a normal and abnormal energy consumption levels of individual UE devices 110, groups of UE devices 110, Protocol Data Unit (PDU) sessions, and/or IP flows to assist in detecting potential DoS or DDoS attacks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
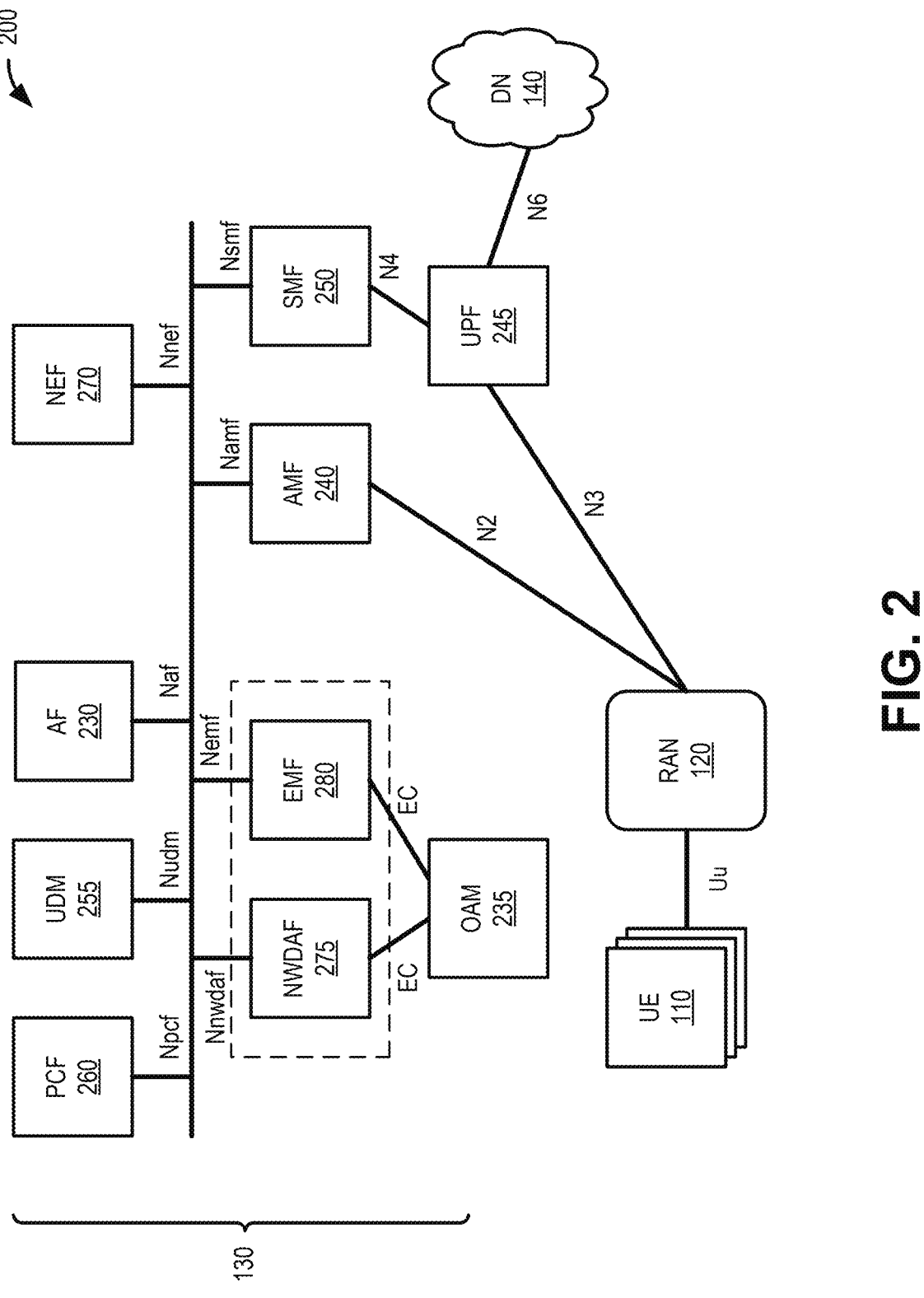
FIG. 2 is a diagram illustrating a network portion for an Energy Consumption (EC) DDoS monitoring service, according to implementations described herein.

FIG. 2 is a diagram illustrating a network portion 200 that includes exemplary components of environment 100 in the context of an EC DDoS monitoring service deployed in core network 130, according to an implementation described herein. As shown in FIG. 2, network portion 200 may include one or more UE devices 110, RAN 120, data network 140, and various components of core network 130 described below. While FIG. 2 depicts a single instance of the network functions in network portion 200 for illustration purposes, in practice, there may be multiple instances of one or more network functions.

The components depicted in FIG. 2 may be implemented as dedicated hardware components or as virtualized functions implemented on top of a common shared physical infrastructure using software defined networking (SDN). For example, an SDN controller may implement one or more of the components of FIG. 2 using an adapter implementing a virtual machine, a containerized network function (CNF) container, an event driven serverless architecture interface, and/or another type of SDN architecture. The common shared physical infrastructure may be implemented using one or more devices 300 described below with reference to FIG. 3 in a cloud computing center associated with core network 130.

Components of core network 130 may correspond to one or more network devices 135. As shown in FIG. 2, components of core network 130 may include an access and mobility management function (AMF) 240, a User Plane Function (UPF) 245, a Session Management Function (SMF) 250, a Unified Data Management (UDM) 255, a Policy Control Function (PCF) 260, a Network Exposure Function (NEF) 270, a Network Data Analytics Function (NWDAF) 275, and an Energy Management Function (EMF) 280. An Application Function (AF) 230 and an Operations, Administration, and Maintenance (OAM) system 235 (also referred to as OAM 235) may also be included as part of core network 130 or a separate network (e.g., an orchestration or provisioning network, not shown). UE device 110, RAN 120, and data network 140 may include features described above in connection with FIG. 1.

AF 230 may provide services associated with a particular application, such as, for example, accessing NEF 270, interacting with a policy framework for policy control, influencing traffic routing, and/or other types of services. AF 230 may access services provided in core network 130 or data network 140. In instances where AF 230 is outside of core network 130 and/or is not a trusted device, NEF 270 may expose to AF 230 the mobile network's capability to support network services. AF 230 may be accessible via an Naf interface.

OAM system 235 may perform tasks for operation, administration, and/or maintenance (or management) of the core network 130 and/or RAN 120. OAM system 235 may obtain operating parameters from wireless access stations 125 and/or network devices 135, such as energy consumption levels. OAM system 235 may also obtain network analytics pertaining to wireless access stations 125 and/or network devices 135. According to an implementation, OAM as a service consumer may access NWDAF 275 and/or EMF 280 via an energy consumption (EC) interface. In order to collect energy consumption data, NWDAF 275 may access OAM system 235 and/or EMF 280 information producers.

AMF 240 may perform registration management, connection management, reachability management, mobility management, lawful intercepts, Short Message Service (SMS) transport, session management message transport between UE device 110 and SMF 250, access authentication and authorization, location services management, functionality to support non-3GPP access networks, and/or other types of management processes. AMF 240 may be accessible to RAN 120 via an N2 interface and to core network devices via an Namf interface.

UPF 245 may maintain an anchor point for intra/inter-RAT mobility, maintain an external Protocol Data Unit (PDU) point of interconnect to a particular data network 150, perform packet routing and forwarding, perform the user plane part of policy rule enforcement, perform packet inspection, perform lawful intercept, perform traffic usage reporting, perform quality of service (QoS) handling in the user plane, perform uplink traffic verification, perform transport level packet marking, perform downlink packet buffering, forward an "end marker" to a RAN 120 node (e.g., access station 125), and/or perform other types of user plane processes. UPF 245 may be accessible to RAN 120 via an N3 interface and to SMF 250 via an N4 interface.

SMF 250 may perform session establishment, session modification, and/or session release, perform IP address allocation and management, perform Dynamic Host Configuration Protocol (DHCP) functions, perform selection and control of UPF 245, configure traffic steering at UPF 245 to guide the traffic to the correct destinations, terminate interfaces toward PCF 260, perform lawful intercepts, charge data collection, support charging interfaces, control and coordinate charging data collection, perform downlink data notification, manage roaming functionality, and/or perform other types of control plane processes for managing user plane data. SMF 250 may be accessible to core devices via an Nsmf interface.

UDM 255 may maintain subscription information for UE devices 110, manage subscriptions, generate authentication credentials, handle user identification, perform access authorization based on subscription data, perform NF registration management, maintain service and/or session continuity by maintaining assignment of SMF 250 for ongoing sessions, support SMS message delivery, support lawful intercept functionality, and/or perform other processes associated with managing user data. UDM 255 may be accessible via an Nudm interface. According to implementations described herein, UDM 255 may store expected/permitted energy consumption levels in a subscription profile for UE devices 110.

PCF 260 may support policies to control network behavior, provide policy rules to control plane functions (e.g., to SMF 250), access subscription information relevant to policy decisions, perform policy decisions, and/or perform other types of processes associated with policy enforcement. In some implementations, PCF 260 may be divided into sub-components, such as a session management (SM)-PCF, a user equipment (UE)-PCF, and an access and mobility (AM)-PCF. PCF 260 may be accessible via an Npcf interface.

NEF 270 may expose capabilities and events to other network functions (NFs), including third party NFs, AFs, edge computing NFs, and/or other types of NFs. Furthermore, NEF 270 may secure provisioning of information from external applications to core network 130, translate information between core network 130 and devices/networks external to core network 130, support a Packet Flow Description (PFD) function, and/or perform other types of network exposure functions, including exposing slice capacity and/or performance data. NEF 270 may be accessible via an Nnef interface.

NWDAF 275 may include a network device that may provide functions and/or services specified by a standards entity (e.g., 3GPP, etc.) and/or of a proprietary nature. NWDAF 275 may collect analytics information associated with RAN 120 and/or core network 130. For example, NWDAF 275 may collect key performance indicators (KPIs), such as accessibility KPIs (e.g., a Radio Resource Control (RRC) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), and/or other types of transport network KPIs. According to implementations described herein, NWDAF 275 may also collect energy consumption data for UE devices 110 and network devices (e.g., network devices 135) that may support the EC DDoS monitoring system. For example, NWDAF 275 may collect energy consumption information for individual devices, functions, slices, sessions, or flows in units of Joules (J) or watt-hours (Wh). NWDAF 275 may include an AI/ML component to process and analyze the various KPIs and provide analytic results to consumer network functions. NWDAF 275 may be accessible to core network devices via an Nnwdaf interface.

EMF 280 (also referred to as an Energy Efficient Control Function) may collect energy-related data from devices in core network 130 and RAN 120. EMF 280 may also incorporate some AI/ML functionality in cooperation with, for example, NWDAF 275. While shown as a separate component in FIG. 2, in other implementations, EMF 280 may be integrated with NWDAF 275. EMF 280 may collect and/or convert energy consumption data to units of Joules (J) or watt-hours (Wh).

As described herein, NWDAF 275 and/or EMF 280, which in some implementations may be combined into a single network function, may include logic that supports generation of energy consumption analytics for the EC DDoS monitoring service. For simplicity, aspects of the EC DDoS monitoring service described further herein, which could be performed by NWDAF 275 and/or EMF 280, are described with reference only to NWDAF 275 or to an AI/ML analytics function that may be distributed among NWDAF 275, EMF 280, or another core analytics function.

NWDAF 275 may provide information related to a normal expected UE energy consumption to detect potential DoS or DDoS attacks. NWDAF 275 may interact with network devices 135 and OAM 235 to collect per-UE/QoS Flow/NF/Slice energy consumption data. In one implementation, NWDAF 275 may classify different classes of expected UE energy profiles, such as IoT vs. non-IoT classes (e.g., with different risk factors). NWDAF 275 may also collect (e.g., from OAM 235) the expected energy consumption for the various network devices 135. For example, as part of mitigation, a different SMF 250 or UPF 245 may be assigned to new sessions and/or IP flows when the energy consumption levels of a default or serving SMF 250 or UPF 245 are above normal levels. NWDAF 275 may use energy consumption training data to identify (a) energy consumption thresholds for user plane UE attacks and/or (b) energy consumption thresholds for control plane UE attacks (e.g., scaled by a signaling storm). Using the energy consumption thresholds, NWDAF 275 may identify misbehaving UE devices 110 (e.g., IoT devices) that are launching user plane (i.e., flooding) DoS/DDoS attacks and/or control plane (i.e., signaling) DoS/DDoS attacks. NWDAF 275 may interact with devices in RAN 120 (e.g., access stations 125) and/or core network 130 (e.g., AMF 240, SMF 250, etc.). Some of the network devices 135 may take appropriate actions against the misbehaving UE devices to mitigate or prevent DDoS attacks.

Although FIG. 2 shows certain components of network portion 200, in other implementations, network portion 200 may include fewer components, different components, differently arranged components, or additional components than depicted in FIG. 2. For example, although not illustrated in FIG. 2, core network 130 may include other network functions, such as a Charging Enablement Function (CEF), a Network Repository Function (NRF), a Network Slice Selection Function (NSSF), etc. Additionally, or alternatively, one or more components of network portion 200 may perform functions described as being performed by one or more other components of network portion 200. Furthermore, while particular interfaces (e.g., N2, N3, N4, Namf, Nnwdaf, EC, etc.) are illustrated with respect to particular function nodes in FIG. 2, some network functions may include other interfaces, such as a reference point architecture that includes point-to-point interfaces between particular function nodes.

Figure 3:
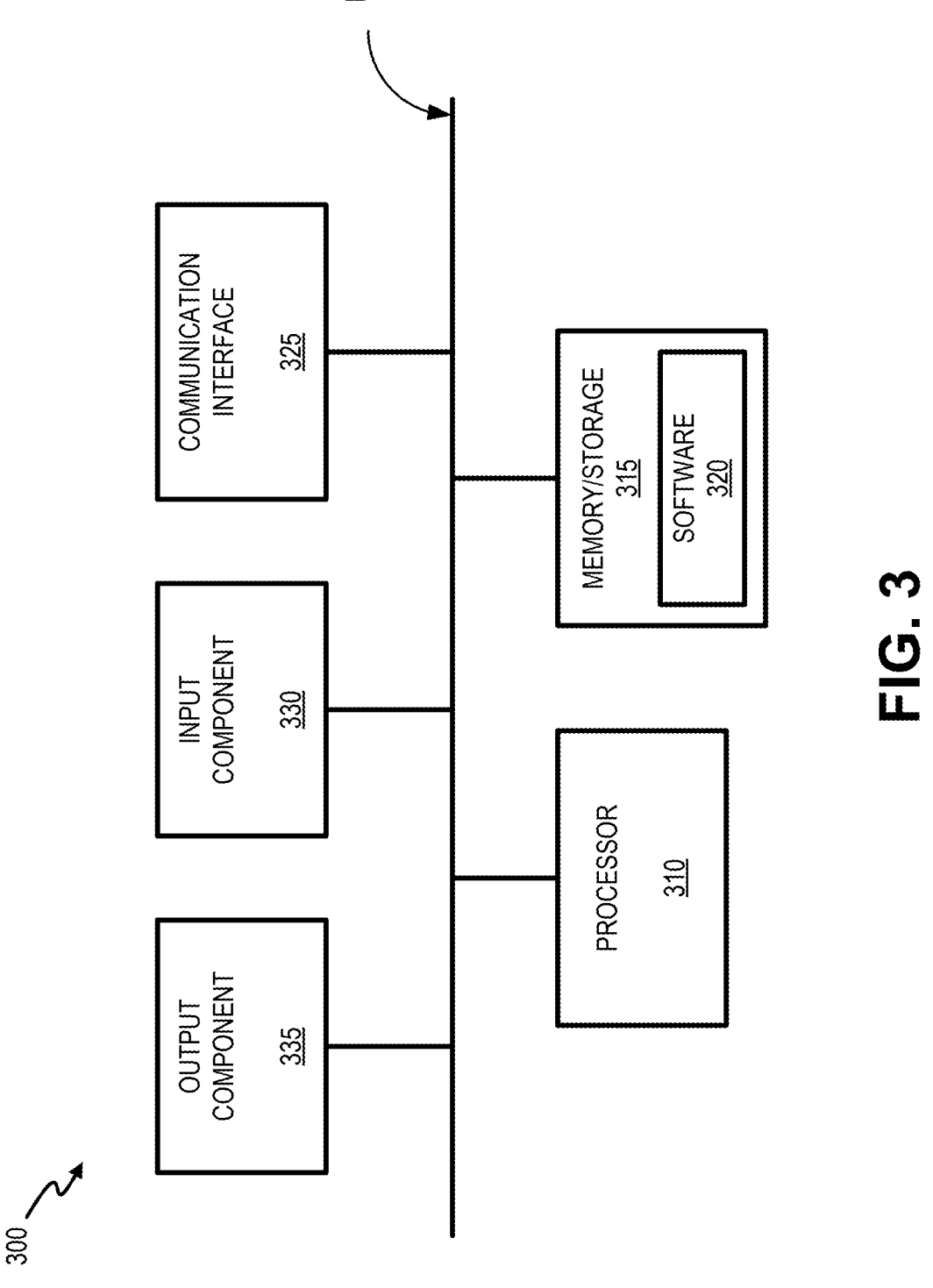
FIG. 3 is a diagram of example components of a device according to an implementation described herein.

FIG. 3 illustrates example components of a device 300 according to an implementation described herein. UE device 110, wireless access station 125, network device 135, AF 230, OAM 235, AMF 240, UPF 245, SMF 250, UDM 255, PCF 260, NEF 270, NWDAF 275, ECF 280, and other devices in environment 100 may each include one or more devices 300.

As illustrated in FIG. 3, device 300 includes a bus 305, one or more processors 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random-access memory (DRAM), cache, read only memory (ROM), a programmable read only memory (PROM), a static random-access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. According to one example, aspects of the EC DDoS monitoring service may be implemented as software 320, such as, for example, implementation of NWDAF 275 as a SDN element.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers (e.g., radio frequency transceivers). Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port for stored data, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
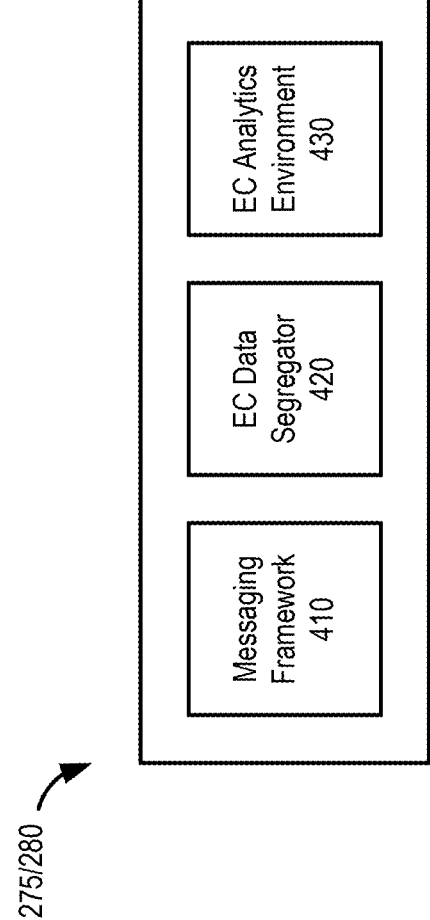
FIG. 4 is a block diagram showing example logical components of an AI/ML analytics function for the EC DDoS monitoring service.

FIG. 4 is a block diagram illustrating examples of logical components of NWDAF 275 to support the EC DDoS monitoring service. NWDAF 275 may generate analytic reports and provide requested reports to different types of network functions (referred to herein as "consumers" or "NF consumers"). Consumers for NWDAF services may include AFs (e.g., AF 230), OAM systems (e.g., OAM 235), AMFs (e.g., AMF 240), SMFs (e.g., SMF 250), UDMs (e.g., UDM 255), PCFs (e.g., PCF 260), etc.

As shown in FIG. 4, NWDAF 275 may include a messaging framework 410, an EC data segregator 420, and an EC analytics environment 430. According to other exemplary embodiments, NWDAF 275 may include additional, different, and/or fewer components. For example, NWDAF 275 may include a data collection coordination function (DCCF), an analytics data repository function (ADRF), and/or another type of component or logic that may facilitate data collection, analytics, and/or subscription services. The components of FIG. 4 may be implemented, for example, by processor 310 in conjunction with memory 315.

Messaging framework 410 may manage standardized interfaces to allow NF consumers to subscribe to and unsubscribe from different analytic events. For example, NWDAF 275 may receive, via messaging framework 410, an analytics request from an NF consumer. The analytics request may be part of a request-response model or a subscription-notification model. The analytics request may include, for example, an Nnwdaf_AnalyticsSubscription-_Subscribe message, an Nnwdaf_AnalyticsSubscription-_Unsubscribe message, or an Nnwdaf_AnalyticsInfo_Request message. The analytics request may further include an analytics identifier that may correspond to energy consumption analytics (e.g., requiring EC event data from selected network function). In one implementation, messaging framework 410 may modify existing standardized NWDAF interfaces with NF consumers to request EC-related analytics. Messaging framework 410 may also use standardized interfaces to notify NF consumers that have a subscription about corresponding observed events. For example, messaging framework 410 may provide to an NF consumer an Nnwdaf_AnalyticsSubscription_Notify message when a requested analytics report is available.

EC data segregator 420 may provide for segmentation of EC data. For example, EC data segregator 420 may identify a data source (e.g., AMF, SMF, UPF, etc.), a slice-type indicator (e.g., URLLC, TSN, V2X, etc.), or another type of indicator for incoming EC data. EC data segregator 420 may direct incoming EC data to EC analytics environment 430.

EC analytics environment 430 may receive and analyze EC data to establish normal EC levels, determine high EC thresholds, and monitor for EC data that exceeds the thresholds (i.e., indicating potentially abnormal behavior). EC analytics environment 430 may include machine learning components and analytics models for EC analytics. EC analytics environment 430 may send a message to consumer NFs to mitigate attacks from a UE device and/or UE group of devices (e.g. M-IoT) and/or PDU session and/or QoS flow that have abnormal behavior.

Although FIG. 4 shows examples of logical components of NWDAF 275, in other implementations, NWDAF 275 may include fewer components, different components, or additional components than depicted in FIG. 4. In addition, functions described as being performed by one of the logical components in FIG. 4 may alternatively be performed by another one or more of the components of NWDAF 275.

FIG. 5 is a diagram illustrating expected UE behavior parameters that may be provided by NWDAF 275 upon request. Table 500 may include an Exception Identifier (ID) field 510, a UE behavior parameters field 515, and a variety of entries that associate a certain exception ID with certain UE behavior parameters. An NF consumer may provide to NWDAF 275 a request to monitor a certain condition, as indicated by an exception ID from field 510. In response to a request and based on the exception ID, NWDAF 275 may provide expected UE behavior parameters from corresponding field 515.

As shown in FIG. 5, an entry 520 with an exception ID of "Suspicion of DDoS attack" may have corresponding UE behavior parameters of "Periodic Time," "Communication Duration Time," "Scheduled Communication Time," "Scheduled Communication Type," "Traffic Profile," and "Expected transaction Dispersion." According to an implementation described herein, "Expected Energy Consumption" 525 may also be included in the list of UE behavior parameters to provide when monitoring for a DDoS attack. Thus, when an NF consumer subscribes to monitor for a possible DDoS attack, NWDAF 275 may provide, along with other parameters, EC levels for requested UE devices, PDU sessions and/or QoS flows.

Figure 6:
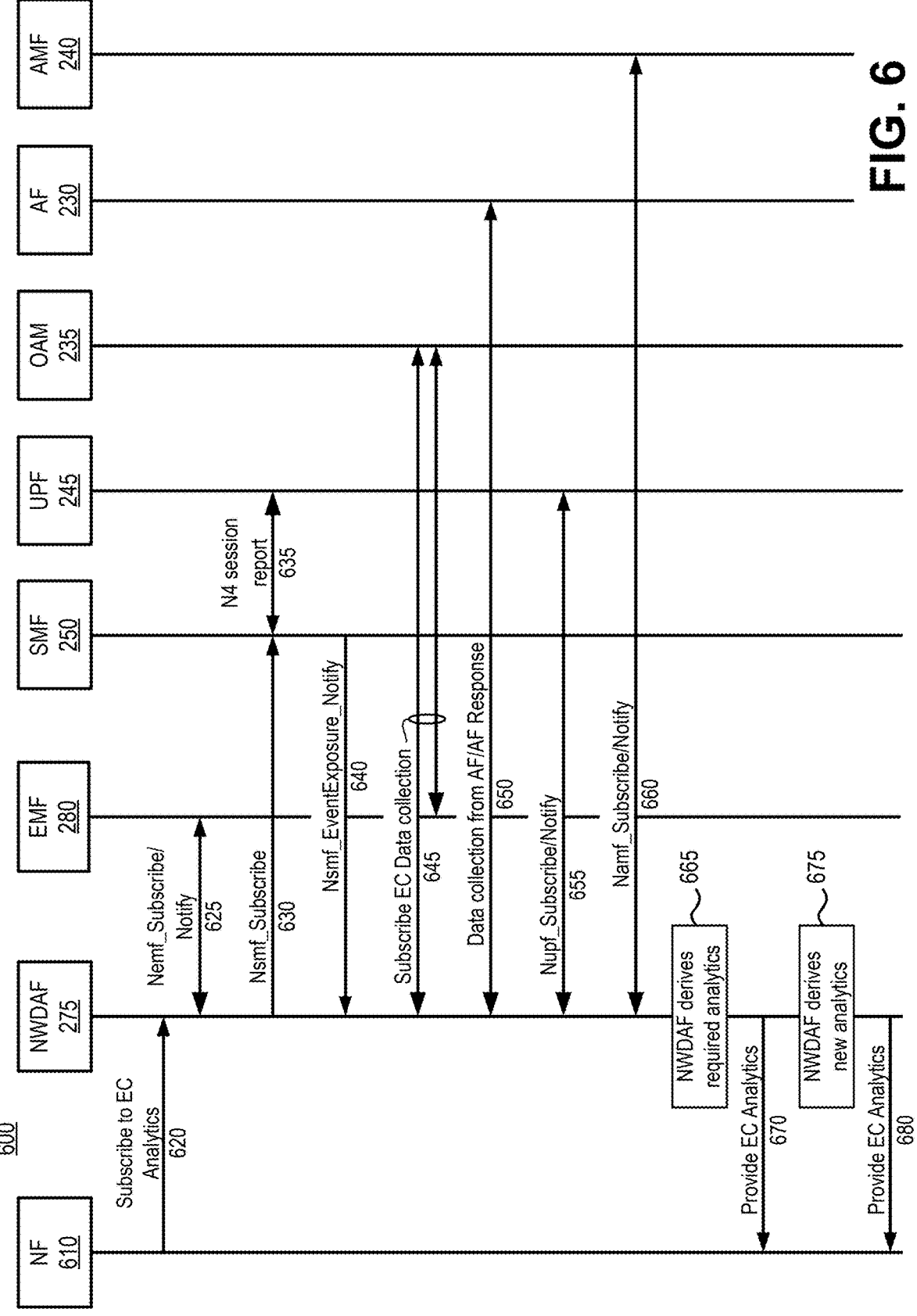
FIG. 6 is a diagram illustrating communications, in a portion of a network environment, to collect data for the EC DDoS monitoring service.

FIG. 6 a signal flow diagram illustrating communications in a portion 600 of network environment 100 to detect and monitor normal energy consumption thresholds. As shown in FIG. 6, network portion 600 may include an NF 610, AF 230, OAM 235, AMF 240, UPF 245, SMF 250, NWDAF 275, and ECF 280. NF 610 may correspond to one or more network devices 135. Communications in FIG. 6 reflect a subscription-based notification model for NWDAF analytics. FIG. 6 provides simplified illustrations of communications in network portion 600 and is not intended to reflect every signal or communication exchanged between devices/ functions. For example, in other implementations a request-response model may be used instead of a subscription-notification model.

As shown in FIG. 6, a commissioning NF 610 (e.g., an NF consumer, such as an SMF, EMF, AF/NEF, PCF, etc.) may subscribe to receive energy-related analytics, from NWDAF 275, to support the EC DDoS monitoring service. For example, an AMF (e.g., AMF 240) may request energy consumption analytics of a UE device and/or UE device groups 110 associated with a particular geographical location or a network slice. Commissioning NF 610 may send an analytics request 620 (e.g., a "Nnwdaf_AnalyticsSubscription_Subscribe" message) to NWDAF 275. Analytics request 620 may include an analytics identifier for a particular service (e.g., "energy consumption monitoring") that requires data from multiple network devices in core network 130. The analytics identifier may correspond to energy consumption measurements for UE devices 110 and network components using a given network slice type, for example.

In response to analytics request 620, NWDAF may subscribe to collect data from necessary network functions. For example, if a separate EMF is supported in core network 130, NWDAF 275 may subscribe 625 to collect energy monitoring data from EMF 280, and EMF 280 may respond accordingly by providing its collected energy consumption data. In one implementation, subscription 625 may include an event exposure request (e.g., Nemf_EventExposure_Subscribe) with an event identifier and EMF 280 may respond with a data notification (e.g., Nemf_EventExposure_Notify).

Furthermore, in response to analytics request 620, NWDAF 275 may subscribe 630 to collect service data from SMF 250. SMF service data may provide NWDAF 275 exposure to PDU session and QoS flow statistics. NWDAF 275 may also subscribe to N4 session related information from SMF 250, which will cause SMF 250 to provide to NWDAF 275 information from N4 session events 635 between SMF 250 and a UPF (e.g., UPF 245). SMF 250 may provide the SMF service data and/or N4 session data via a data notification 640 (e.g., Nsmf_EventExposure_Notify).

Also, in response to analytics request 620, NWDAF 275 may subscribe to energy consumption data 645 from OAM 235. For example, OAM 235 may provide RAN-related energy consumption data collected from wireless access stations 125. Additionally, or alternatively, EMF 280 may subscribe to receive energy consumption data 645 from OAM 235, which may then be passed from EMF 280 to NWDAF 275 as part of subscription 625. NWDAF 275 may also perform data collection 650 to receive service data from AF 230. As shown at reference 655, NWDAF 275 may establish a subscription to directly collect service data from UPF 245. The UPF information, such as data volume, enables NWDAF 275 to establish expected data volume energy consumption per UE device, per PDU session, and per slice.

As shown at reference 660, NWDAF 275 may subscribe to service data from AMF 240. The AMF information, such as UE location, enables NWDAF 275 to correlate the UE devices 110 involved in a slice or geographical location, or wireless access station that is under DoS/DDoS attack.

NWDAF 275 may compile data in responses from EMF 280, SMF 250, UPF 245, OAM 235, AF 230, and AMF 240. Using AI/ML, for example, NWDAF 275 may derive the consumer requested EC related analytics, as shown at reference 665. In one implementation, NWDAF 275 may establish requested energy consumption levels and help to establish the expected normal levels that can be used to detect abnormal behavior for the EC DDoS monitoring service.

NWDAF 275 may send the requested analytics information 670 (e.g., via a Nnwdaf_AnalyticsResponse/Notify message) in response to request 620. In one implementation, the analytics information be stored in a database of EMF 280 as normal (or baseline) behavior values for energy consumption. In another implementation, the derived expected EC value may also be provisioned in UDM 255 subscription information for the purpose of DoS/DDoS detection levels and also for potential charging aspects.

Once a normal behavior threshold is determined, the consumer NF 610 may register for energy consumption notifications, such as triggers related to a threshold level crossing, pointing to abnormal behavior. For example, using similar data collection steps to references 625-660 described above, NWDAF 275 may receive energy consumption-related data and derive new analytics, as indicated by reference 675. The new analytics may include, for example, indications of an energy consumption threshold being exceeded. When the new analytics are derived, NWDAF 275 may provide a report 680 to the consumer NF 610.

Figure 7:
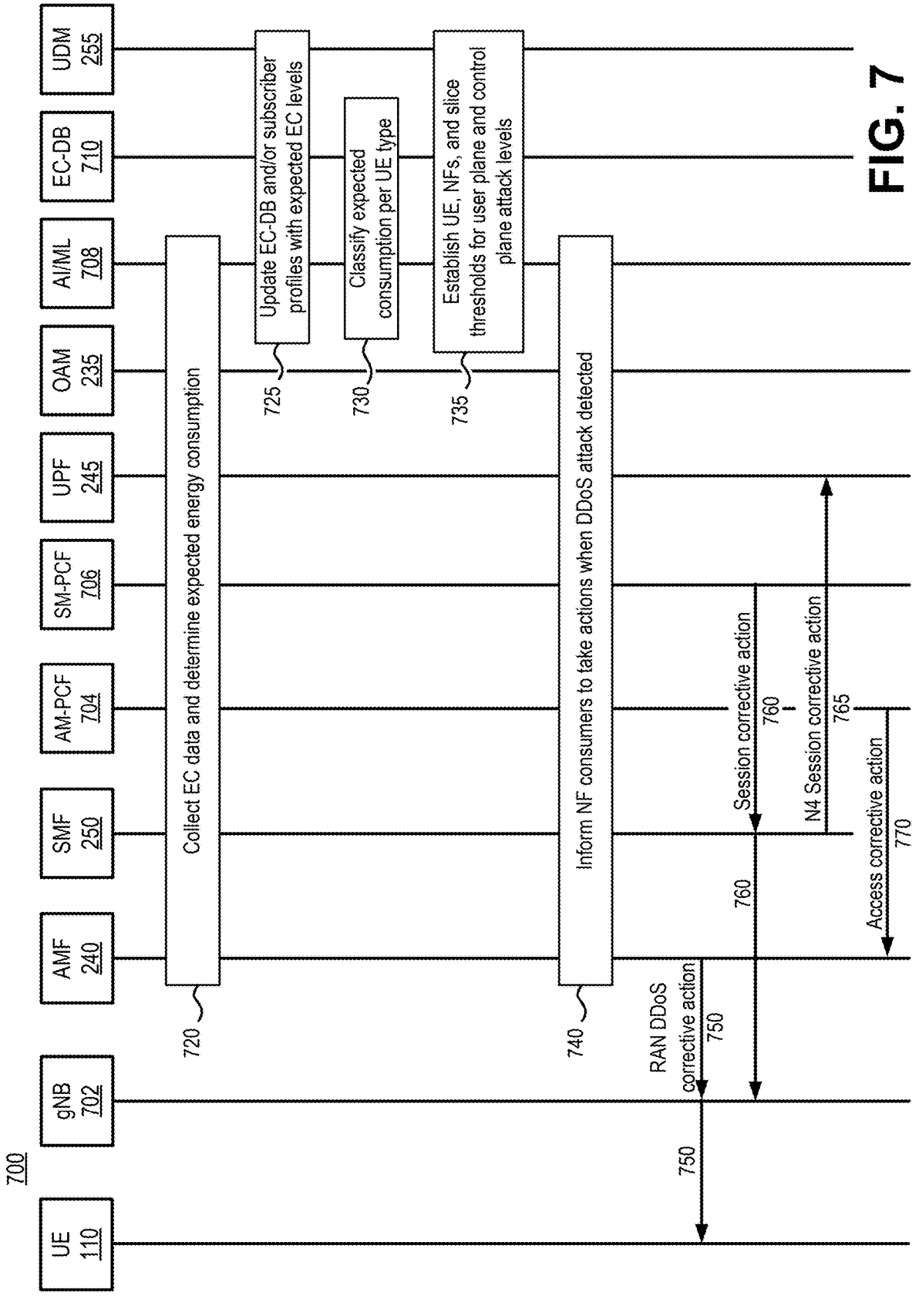
FIG. 7 is a diagram illustrating communications, in another portion of a network environment, to implement the EC DDoS monitoring service.

FIG. 7 is a diagram illustrating activities in a portion 700 of network environment 100 to detect and provide an EC DDoS monitoring service. Activities shown in FIG. 7 provide simplified illustrations of communications in network portion 700 and are not intended to reflect every signal or communication exchanged between devices/functions.

As shown in FIG. 7, network portion 700 may include UE device 110, AF 230, AMF 240, UPF 245, SMF 250, UDM 255, OAM 235, a gNB 702, an SM-PCF 706, an AI/ML analytics function 708, and an EC database (DB) 710. The gNB 702 may correspond to one of access stations 125. AM-PCF 704 may correspond to a subset of PCF 260 that may interact with an AMF and may provide policies that relate to access and mobility management to the AMF. SM-PCF 706 may correspond to a subset of PCF 260 that may manage session management policies and provide session management control services. AI/ML analytics function 708 may correspond to an NWDAF 275 and/or EMF 280 that includes logic to support the EC DDoS monitoring service. EC database 710 may include a database associated with, and or accessible to, AI/ML analytics function 708. EC database 710 may be part of EMF 280, an independent database, or part of a data lake compiling performance data from multiple network sources.

As shown at reference 720, in response to an NF consumer request, AI/ML analytics function 708 may collect energy consumption data from core network devices 135, application functions, and/or OAM 235 (which may provide RAN EC data, for example). Collected energy consumption data may correspond to communications described in FIG. 6.

As shown at reference 725, AI/ML analytics function 708 may update EC-DB 710 with UE expected energy consumption data and provision UDM 255 with energy consumption levels associated with UE device profile. For example, AI/ML analytics function 708 may determine the expected energy consumption for a requested granularity (e.g. per UE, per PDU session, per QoS flow, per slice, per NF) and store the EC level (or threshold) in EC-DB 710. The expected and provisioned UE energy consumption level can be stored and updated in EC-DB 710 and UDM 255 per ongoing collected statistics.

AI/ML analytics function 708 may classify expected energy consumption per UE type, as shown at reference 730.

For example, AI/ML analytics function 708 may distinguish between different types of UE devices 110 and classify each UE device 110 in a different class of expected UE EC behavior. The classification may also establish a baseline of expected energy consumption for each device type. The classification of each UE device type may be tied to EC provisioning and EC charging. The provisioned EC levels may help remediate DoS/DDoS attacks when the charging system limits the service of UE devices that cross the provisioned EC threshold.

AI/ML analytics function 708 may also establish thresholds for UE devices, network functions, and slices for both user plane and control plane DoS/DDoS attacks, as indicated at reference 735. For example, AI/ML analytics function 708 may establish UE, NFs, PDU session, QoS flows, and slice EC thresholds for the user plane and control plane to identify potential security attack when energy consumption is deviating from the previously determined norms. As shown at reference 740, when any of the EC thresholds are crossed, AI/ML analytics function 708 may inform subscribed consumer NFs (e.g., any NF 610) to take action per each suspected DoS/DDoS attack.

In response to the notification from AI/ML analytics function 708, the different NF consumers 610 may take appropriate remediation actions. For example, as shown at reference 750, if AMF 240 is the consumer, AMF 240 may perform access and mobility management procedures, such as deregistering a UE device 110 that is exhibiting unexpected abnormal behavior. In case of abnormal signaling plane EC, AMF 240 may use an N2 overload mechanism (such as outlined in various network standards) to reduce the loading of gNB 702 (or other nodes in RAN 120). If slice energy consumption is abnormal, AMF 240 (and/or an NSSF, not shown) may reject additional UE devices wishing to be served by the slice and also disconnect abnormal UE devices, discontinue sessions, and/or terminate QoS flows that are served by the slice subject to excessive energy consumption.

As shown at reference 760, If SM-PCF 706 is the consumer, SM-PCF 706 may update SMF 250 with a corresponding access policy indicating rules for the adjustment of sessions or QoS flow parameters or rules for the deactivation of a session per suspected DoS/DDoS attack based on the energy consumption increase. In another implementation, SMF 250 may serve as the subscribed analytics consumer and perform similar functions upon a notification from AI/ML analytics function 708. In case of abnormal signaling plane energy consumption, SMF 250 may use an overload control mechanism (such as outlined in various network standards) to reduce its loading, as indicated at reference 765.

As shown at reference 770, if the AM-PCF 704 is the consumer, AM-PCF 704 may change an access policy causing AMF 240 to de-register UE devices, with unexpected abnormal energy consumption, from the network (e.g., the transport network) or from a slice when the slice abnormal EC is above a threshold.

In other implementations, additional remediation actions may also be used. For example, a charging system (e.g., a CHF, not shown) can also help remediate a DoS/DDoS attack by not allowing a UE device to spend more NF energy than provisioned (e.g., similar to a pre-paid data provisioning plan) where the EC level of provisioning may be derived by the established norm determined by, for example, AI/ML analytics function 708.

FIG. 8 is a flow diagram illustrating an exemplary process 800 for providing an EC DDoS monitoring service, according to implementations described herein. In one implementation, process 800 may be implemented by AI/ML analytics function 708 (e.g., being executed on an NWDAF 275 and/or EMF 280). In another implementation, process 800 may be implemented by AI/ML analytics function 708 and one or more network devices 135 (e.g., AMF 240, SMF 250, PCF 260, etc.).

Process 800 may include collecting energy consumption data (block 810) and identifying normal energy consumption levels of UE devices and PDU sessions associated with the UE devices (block 820) For example, as described in connection with FIG. 6, NWDAF 275 may receive an EC analytics request and retrieve data from different core network devices 135 such as an AF 230, AMF 240, UPF 245, SMF 250, OAM 235, etc. Using the EC data, NWDAF 275 may establish energy consumption levels and help to establish expected normal levels that can be used to detect abnormal behavior for the EC DDoS monitoring service.

Process 800 may further include classifying expected consumption levels per UE device type (block 830) and determining energy consumption thresholds indicative of a DDoS attack (block 840). For example, based on the normal EC levels, NWDAF 275 may classify different classes of expected energy UE profiles, such as IoT and non-IoT, to associate different risk factors. NWDAF 275 may also indicate threshold EC levels for types of UE devices, PDU sessions, and/or IP flows. The threshold levels may correspond, for example, to energy consumption values (e.g., in J or Wh) that exceed the normal EC values by a margin large enough to suggest a possible DDoS attack. According to an implementation, separate energy consumption thresholds may be established and provided for detecting user plane UE attacks and control plane UE attacks. In some implementations, the AI/ML analytics function 708 may provide a suggested threshold value that may be confirmed/adjusted by a consumer function or a network administrator.

Process 800 may also include collecting updated energy consumption data (block 850) and monitoring the updated energy consumption data against the energy consumption thresholds to detect a DDoS attack (block 860). For example, using data collection steps similar to those described in FIG. 6, NWDAF 275 may receive energy consumption-related data from network devices 135 and derive new analytics based on the energy consumption thresholds. The new analytics may include, for example, indications that energy usage for a UE device, PDU session, or IP flow exceeds an energy consumption threshold.

Process 800 may additionally include informing a consumer network function of a possible DDoS attack when an energy consumption threshold has been exceeded (block 870). For example, NWDAF 275 may send a message to a consumer network device of a possible DDoS attack when the monitoring of the updated energy consumption data indicates one or more of the energy consumption thresholds have been exceeded. As shown in FIG. 7, for example, NWDAF 275 may provide notices to different consumer NFs, such as AMF 240, SMF 250, SM-PCF 706, or AM-PCF 704 in response to NWDAF 275 detecting that an energy consumption threshold has been exceeded.

Process 800 may further include initiating a remediation action in response to being informed of the possible DDoS attack (block 880). For example, as described above in connection with FIG. 7, one or more of AMF 240, SMF 250, AM-PCF 704, and SM-PCF 706 may receive a notice from AI/ML analytics function 708 (e.g., NWDAF 275) and initiate corrective actions in RAN 120 or core network 130 to remedy a DDoS attack.

Systems and methods described herein provide an EC DDoS monitoring service that leverage unique information related to normal expected UE energy consumption. A network device in a core network may collect, from one or more network devices in a core network, energy consumption data and identify, based on the energy consumption data, normal energy consumption levels of one or more UE devices or network functions. The network device may determine, based on the normal energy consumption levels, energy consumption thresholds indicative of a DoS or DDoS attack.

The foregoing description of implementations provides illustration but is not intended to be exhaustive or to limit the invention to the precise form disclosed. Modifications and variations are possible in light of the above teachings or may be acquired from practice of the invention. Also, while series of blocks have been described with regard to the processes illustrated in FIG. 8, and series of signals with respect to FIGS. 6 and 7, the order of the blocks and/or signals may be modified according to other embodiments.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
collecting, by a first network device and from one or more second network devices in a core network, energy consumption data;
identifying, by the first network device and based on the energy consumption data, normal energy consumption levels of one or more user equipment (UE) devices and one or more network functions;
determining, by the first network device and based on the normal energy consumption levels, energy consumption thresholds indicative of a denial-of-service (DoS) or distributed denial-of-service (DDoS) attack, wherein the energy consumption thresholds include a UE energy consumption threshold, a quality of service (QoS) flow energy consumption threshold, and a network slice energy consumption threshold;
monitoring, by the first network device, updated energy consumption data against the energy consumption thresholds to detect a DoS or DDoS attack; and
sending, by the first network device, a DoS or DDoS attack notice when the monitoring of the updated energy consumption data indicates one or more of the energy consumption thresholds have been exceeded.

2. The method of claim 1, further comprising:
collecting, from the one or more second network devices in the core network, the updated energy consumption data.

3. The method of claim 1, wherein the energy consumption data includes measurement data in units of Joules or watt-hours.

4. The method of claim 1, wherein sending the DoS or DDoS attack notice includes sending the DoS or DDoS attack notice to at least one of:
a session management function (SMF),
an access and mobility management function (AMF),
a policy control function (PCF), or
operations, administration, and maintenance (OAM) system.

5. The method of claim 1, wherein identifying normal energy consumption levels of UE devices further comprises:
identifying normal energy consumption levels of Internet Protocol (IP) flows associated with the UE devices, or
identifying normal energy consumption levels of protocol data unit (PDU) sessions associated with the UE devices.

6. The method of claim 1, further comprising:
classifying, based on the identifying, a device type of the UE devices.

7. The method of claim 6, further comprising:
provisioning, in a subscription profile, an energy consumption level associated with the UE device, based on the classifying.

8. The method of claim 1, wherein determining the energy consumption thresholds indicative of a DoS or DDoS attack includes:
determining user plane thresholds for energy consumption on a network slice, and
determining control plane thresholds for energy consumption on a network slice.

9. The method of claim 1, further comprising:
initiating a remediation action to mitigate or prevent a DoS or DDoS attack when one or more of the energy consumption thresholds is exceeded.

10. A system, comprising:

one or more first network devices configured to:

collect, from one or more second network devices in a core network, energy consumption data;

identify, based on the energy consumption data, normal energy consumption levels of user equipment (UE) devices and one or more network functions;

determine, based on the normal energy consumption levels, energy consumption thresholds indicative of a denial-of-service (DoS) or distributed denial-of-service (DDoS) attack, wherein the energy consumption thresholds include a UE energy consumption threshold, a quality of service (QoS) flow energy consumption threshold, and a network slice energy consumption threshold;

monitor updated energy consumption data against the energy consumption thresholds to detect a DoS or DDoS attack; and send a DoS or DDoS attack notice when the monitoring of the updated energy consumption data indicates one or more of the energy consumption thresholds have been exceeded.

11. The system of claim 10, wherein the one or more first network devices are further configured to:

collect, from the one or more second network devices in the core network, the updated energy consumption data.

12. The system of claim 11, wherein the one or more first network devices are further configured to:

collect the updated energy consumption data in units of Joules or watt-hours.

13. The system of claim 10, wherein the one or more first network devices include:

a network data analytics function (NWDAF), or an energy management function (EMF) for a core network.

14. The system of claim 10, wherein, when sending the DoS or DDoS attack notice, the one or more first network devices are further configured to send the DoS or DDoS attack notice to at least one of:

a session management function (SMF), an access and mobility management function (AMF), a policy control function (PCF), or an operations, administration, and maintenance (OAM) system.

15. The system of claim 10, wherein, when identifying normal energy consumption levels of UE devices, the one or more first network devices are further configured to:

identify normal energy consumption levels of Internet Protocol (IP) flows associated with the UE devices, or identify normal energy consumption levels of protocol data unit (PDU) sessions associated with the UE devices.

16. The system of claim 10, wherein the one or more first network devices are further configured to:

classify, based on the identifying, a device type of the UE devices.

17. The system of claim 10, wherein, when determining the energy consumption thresholds indicative of a DoS or DDoS attack, the one or more first network devices are further configured to:

determine user plane thresholds for energy consumption on a network slice, and determine control plane thresholds for energy consumption on a network slice.

18. A non-transitory, computer-readable storage media storing instructions, which, when executed by one or more processors of a first network device, cause the network device to:

collect, from one or more second network devices in a core network, energy consumption data;

identify, based on the energy consumption data, normal energy consumption levels of user equipment (UE) devices and one or more network functions;

determine, based on the normal energy consumption levels, energy consumption thresholds indicative of a denial-of-service (DoS) or distributed denial-of-service (DDoS) attack, wherein the energy consumption thresholds include a UE energy consumption threshold, a quality of service (QoS) flow energy consumption threshold, and a network slice energy consumption threshold;

monitor updated energy consumption data against the energy consumption thresholds to detect a DoS or DDoS attack; and send a DoS or DDoS attack notice when the monitoring of the updated energy consumption data indicates one or more of the energy consumption thresholds have been exceeded.

19. The non-transitory, computer-readable storage media of claim 18, further comprising instructions to cause the first network device to:

collect, from the one or more second network devices in the core network, the updated energy consumption data.

20. The non-transitory, computer-readable storage media of claim 18, further comprising instructions to cause the first network device to:

classify, based on the identifying, a device type of the UE devices.

* * * * *